United States Patent [19]
Baldas et al.

[11] Patent Number: 6,145,910
[45] Date of Patent: Nov. 14, 2000

[54] METHOD OF INSTALLING A VEHICLE INTERIOR

[75] Inventors: Jason Paul Baldas, Warren; Gerald Oscar Morrison, Beverly Hills; Kevin Gasparotto, Livonia; Robert John Dowell, Rochester; Eileen Marie Avram, Canton; Michelle Girolamo, Livonia, all of Mich.

[73] Assignee: Lear Corporation, Southfield, Mich.

[21] Appl. No.: 09/475,918

[22] Filed: Dec. 30, 1999

[51] Int. Cl.[7] .................................................. B60N 2/02
[52] U.S. Cl. ................................. 296/65.01; 296/65.03; 296/64; 296/63; 297/378.13; 248/503.1
[58] Field of Search .................................. 296/63, 65.01, 296/65.03, 64; 297/378.13; 248/503.1

[56] References Cited

U.S. PATENT DOCUMENTS

| | | | |
|---|---|---|---|
| 4,690,364 | 9/1987 | Constantin | 296/65.04 |
| 4,946,216 | 8/1990 | Demick | 296/63 |
| 4,971,379 | 11/1990 | Rumpel et al. | 296/63 |
| 5,280,987 | 1/1994 | Miller | 296/65.03 |
| 5,346,152 | 9/1994 | Mastrangelo et al. | 296/65.03 |
| 5,372,398 | 12/1994 | Aneiros et al. | 296/65.03 |
| 5,443,239 | 8/1995 | Laporte | 296/65.03 |
| 5,497,708 | 3/1996 | Jeruzal | 248/503.01 |
| 5,611,589 | 3/1997 | Fujii et al. | 296/65.03 |
| 5,788,314 | 8/1998 | Hayes et al. | 248/503.1 |
| 5,921,606 | 7/1999 | Moradell et al. | 296/65.03 |
| 5,997,069 | 12/1999 | Coffey et al. | 296/65.01 |
| 6,012,755 | 1/2000 | Hecht et al. | 296/65.03 |

*Primary Examiner*—Joseph D. Pape
*Assistant Examiner*—Kiran Patel
*Attorney, Agent, or Firm*—MacMillan, Sobanski, & Todd, LLC

[57] ABSTRACT

A method of fastening a seat to a vehicle floor having preexisting seat mounting locations includes providing a seat having a frame with mounting locations different from the preexisting mounting locations of the vehicle floor. An adapter bracket is provided having first mounting locations corresponding to the mounting locations of the vehicle floor and second mounting locations corresponding to the mounting locations of the frame of the seat. The adapter bracket is secured to the vehicle floor. The frame of the seat is secured to the adapter bracket, thereby fastening the seat to the vehicle floor. A method of installing various panels over a framework of a vehicle interior is also disclosed.

12 Claims, 15 Drawing Sheets

METHOD OF INSTALLING A VEHICLE INTERIOR

BACKGROUND OF THE INVENTION

This invention relates in general to vehicle interiors, and in particular to a method of installing seats and interior trim panels into a vehicle.

Passenger vehicles are generally equipped with a plurality of occupant seats. Larger passenger vehicles, such as vans and sport utility vehicles, commonly have multiple rows of seats. Commonly, each row includes either a relatively wide bench-type seat or two or three bucket-type seats. The seats can be removably mounted or permanently mounted to the vehicle. Typically, if a vehicle has three rows of seats, the last or rear row of seats is removably mounted to provide a relatively large cargo area when the seats are removed. The seats have lower frame members which are directly fastened to the floor of the vehicle. Each vehicle platform includes specific mounting locations positioned on the floor of the vehicle. Commonly, these floor mounting locations are generally unique to each vehicle platform due to the size and shape of the interior of the vehicle, and the size and shape of the seat. Therefore, the lower frames of the seats are designed with mounting locations specific for the mounting locations of the vehicle platform in which the seats are installed. Since most vehicle manufactures have many types of vehicle platforms, there is a relatively large number of different seats having unique mounting locations. This inventory of different seats can be costly to the vehicle manufacture due to design and inventory costs of the different seat styles.

In the past, to convert a pre-existing seat design to fit into another vehicle platform other than the one the seat was initially designed for, the seat frames or the vehicle floor couplings were redesigned to match the corresponding mounting locations. This redesigning can be costly due to the rigorous safety criteria that must be met for seat structures under relatively large impact loads. Thus additional testing is typically required to ensure that the redesign conforms the required safety standards.

Vehicle interiors have various trim panels to cover the structural framework of the vehicle. The trim panels are manufactured in various sizes and contours to accommodate the particular section of framework that the trim panels are covering. The trim panels are often configured to cover consistent contours of the framework, and many trim panels are used to cover a relative small area of framework, for example, around the periphery of a window. Costs of the vehicle can increase due to the time required to install the relatively large amount of panels. The trim panels can be a simple covering or can incorporate convenience features, such as storage compartments, drink holders, ashtrays, electrical connections, and lights. Although the trim panels are fastened to the framework of the vehicle by a generally permanent connection, the trim panels are often removably fastened to accommodate replacement of the trim panels or to permit access behind the trim panels for repairs of structures behind the trim panel. The trim panels are typically designed to overlap at the edges of adjacent trim panels, for aesthetic and securement reasons. Due to the overlapping design of the trim panels, it is customary, but undesirable, to remove multiple trim panels even though access behind a single panel is desired.

BRIEF SUMMARY OF THE INVENTION

This invention relates in general to a method of installing a vehicle interior including seats and interior trim panels.

One of the methods of the present invention relates to the fastening of a seat to a vehicle floor. The vehicle floor has preexisting seat mounting locations designed for an originally equipped seat. A second seat different from the originally equipped seat is provided having a frame with mounting locations different from the preexisting mounting locations of the vehicle floor. An adapter bracket is provided having first mounting locations corresponding to the mounting locations of the vehicle floor and second mounting locations corresponding to the mounting locations of the frame of the seat. The adapter bracket is secured to the vehicle floor. The frame of the seat is secured to the adapter bracket, thereby fastening the seat to the vehicle floor.

Another method of the present invention relates to the installation of various panels over a framework of one side of a vehicle interior. The framework includes at least first, second, and third vertically extending pillars. A window opening is formed in the framework. The framework also includes a sill plate located underneath the window opening. A first panel is fastened over a lower portion of the first pillar. Next, a second panel is fastened over the sill panel and a lower portion of at least one of the second pillar and the third pillar. Third, fourth, and fifth panels are then fastened to upper portions of the first, second, and third pillars. A sixth panel is then fastened to a lower portion of the other of the at lest one of the second pillar and the third pillar.

Various objects and advantages of this invention will become apparent to those skilled in the art from the following detailed description of the preferred embodiment, when read in light of the accompanying drawings.

DETAILED DESCRIPTION OF THE INVENTION

Figure 1:
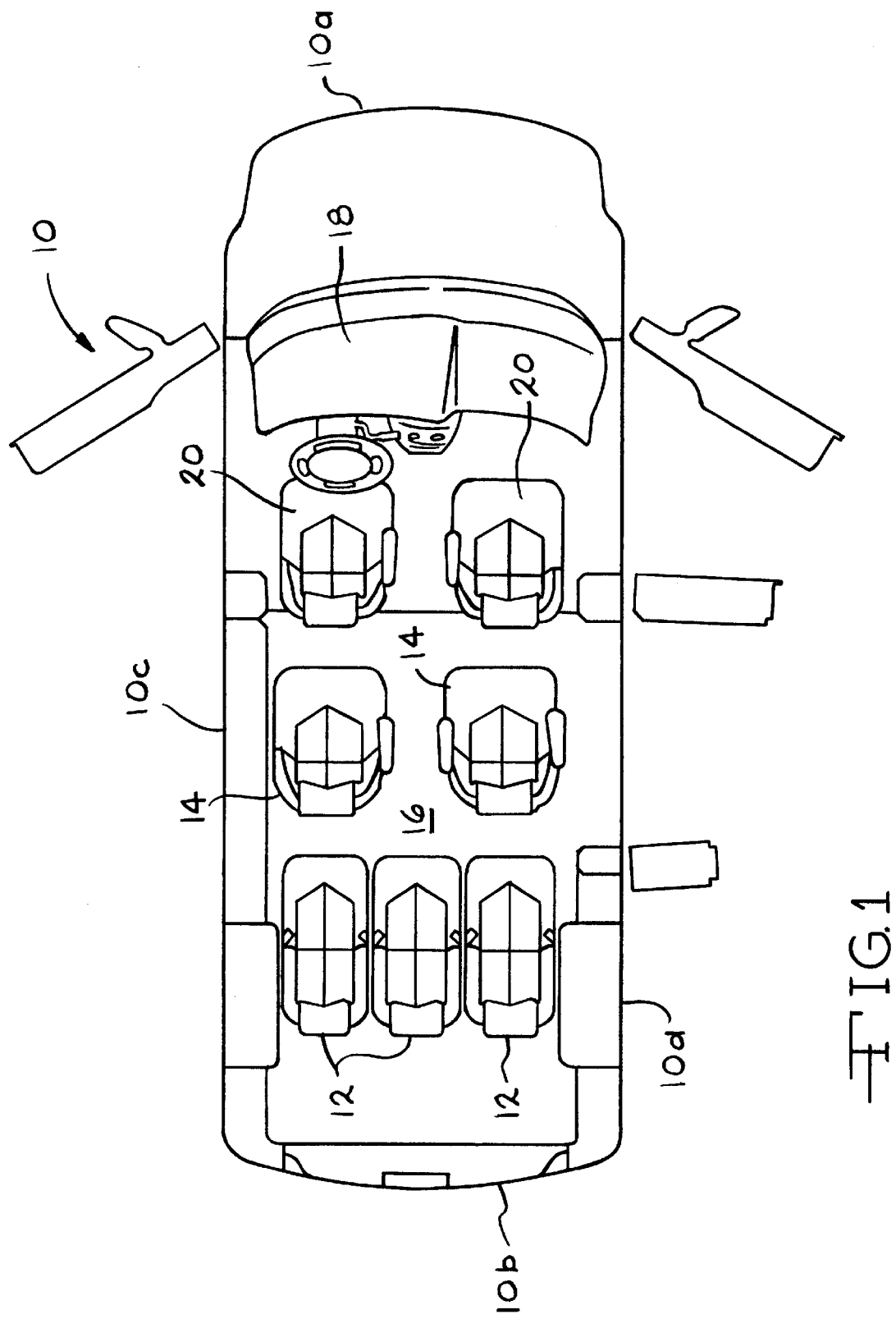
FIG. 1 is a schematic top plan view of an interior of a vehicle having seats and interior trim panels installed in accordance with the present invention.

Referring now to the drawings, there is schematically illustrated in FIG. 1 an interior of a vehicle 10, such as a van. As will be discussed in detail below, the interior of the vehicle 10 includes a rear row of seats 12, a middle row of seats 14, and various trim panels which are installed in accordance with the present invention. Although there can be any number of seats in the rear and middle rows of seats 12 and 14, there is illustrated three seats 12 for the rear row, and two seats for the middle row. Of course, the vehicle 10 can have any number of rows, having any number of seats per row.

The vehicle 10 generally has a front end 10a, a rear end 10b, a left side 10c and a right side 10d. The vehicle 10 also includes a vehicle floor 16 which generally extends from the rear end 10b to a conventional instrument panel 18. The vehicle also has a pair of front seats 20 which can be fastened to the vehicle floor 16 by conventional methods or by the methods disclosed in detail below in accordance with the present invention.

Figure 2:
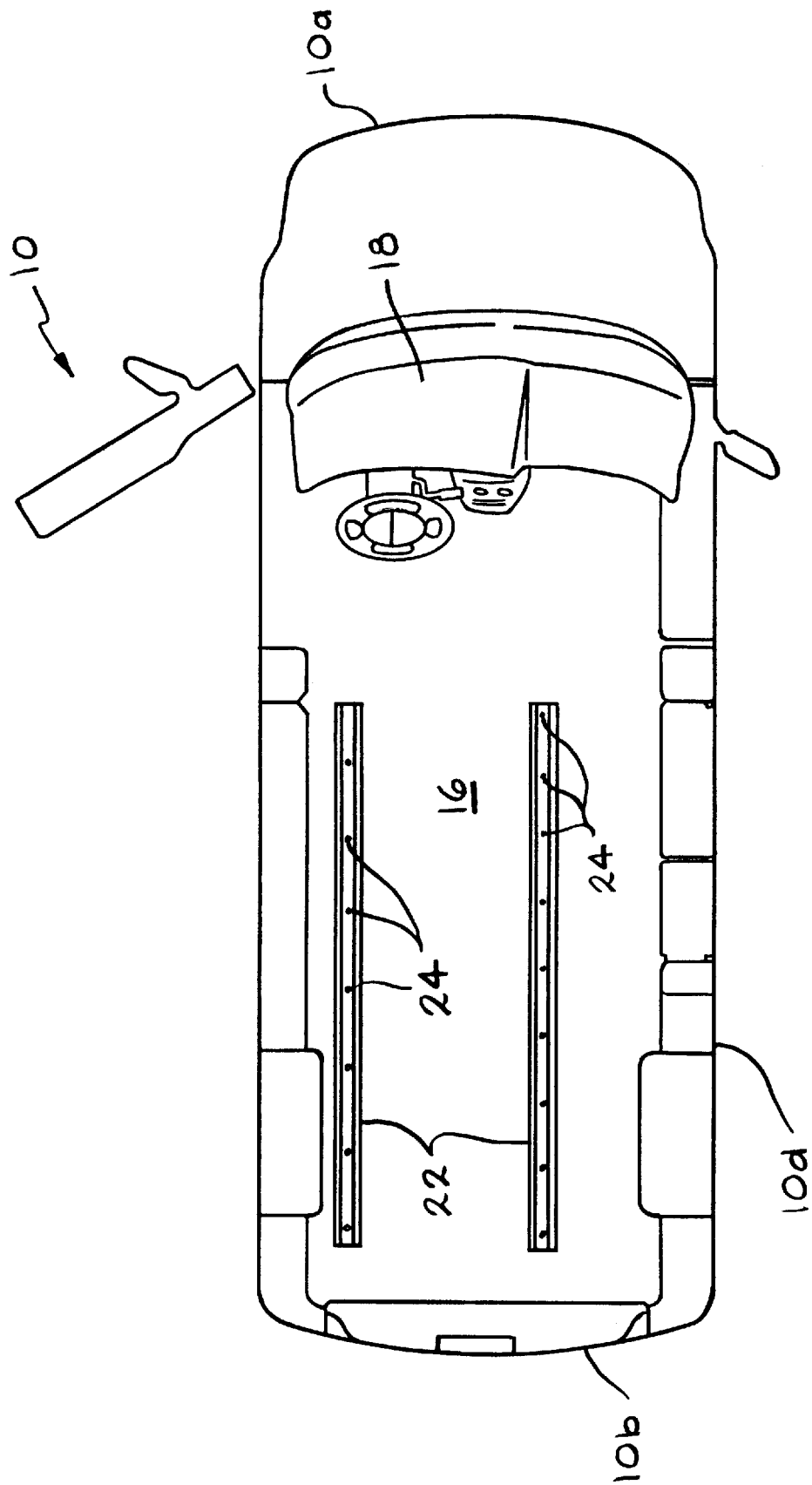
FIG. 2 is a schematic top plan view of the interior of the vehicle of FIG. 1 prior to installation of the seats.

The vehicle 10 is representative of a vehicle which was designed for having originally equipped seats (not shown) installed therein such that the originally equipped seats are different from the seats 12 and 14. The seats 12 and 14 could be, for example, optional upgraded seats or seats which were designed to be installed into another vehicle. The vehicle 10 has pre-existing mounting locations which correspond to mounting locations for the originally equipped seats. Thus the originally equipped seats have different mounting locations than the mounting locations of the seats 12 and 14. The mounting locations between the originally equipped seats and the seats 12 and 14 can be different due to differences in the fasteners or couplings used to fasten the seats to the vehicle floor 16, or due to the difference in spacing between the fasteners or couplings. The method of the present invention relates to installing seats, such as seats 12 and 14, into a vehicle which was originally designed and constructed to accommodate the mounting locations of originally equipped seats. For example, the illustrated embodiment of the vehicle 10, as shown in FIGS. 1 and 2, a pair of rails 22 mounted to the vehicle floor 16. The rails 22 are mounted to the vehicle floor 16 by any suitable manner, such as by a plurality of threaded fasteners 24 positioned throughout the length of the rails 22, as shown in FIG. 2. The rails 22 previously provided mounting locations to fasten the originally equipped seats (not shown) to the vehicle floor 16. For example, the originally equipped seats (not shown) could have included laterally extending bars positioned across the rails 22 in a direction normal to the rails 22. The bars of the originally equipped seats could then be fastened to the rails 22 at appropriate locations along the length of the rails 22. The rails 22 provide a fastening structure preferably able to withstand an impact load acting by rapid deceleration of the seats. This impact load is transmitted from the bars of the seat to the vehicle floor 16.

Figure 3:
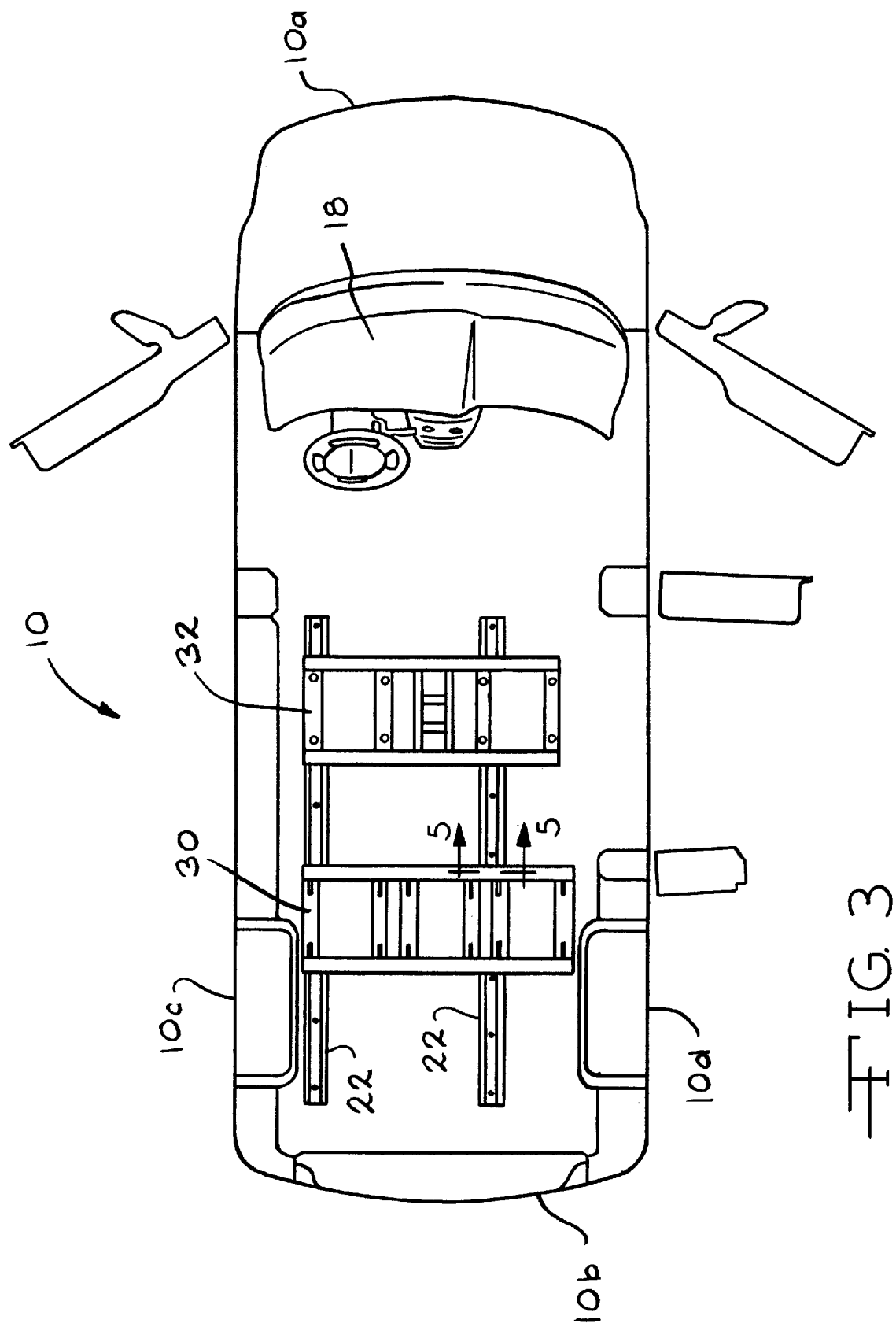
FIG. 3 is a schematic to plan view of the interior of the vehicle of FIG. 1 having first and second seat mounting brackets installed therein.

Instead of redesigning the seats 12 and 14 to accommodate the mounting locations of the vehicle 10, such as the rails 22, an adapter bracket is used. As shown in FIG. 3, a rear adapter bracket 30 is used for the seats 12, and a middle adapter bracket 32 is used for the seats 14. As described in detail below, the adapter brackets 30 and 32 have one set of mounting locations corresponding to the mounting locations of the vehicle floor 16, and another set of mounting locations corresponding to the mounting locations of the seats 12 and 14. The illustrated adapter brackets 30 and 32 are two examples of how the respective seats 12 and 14 can be secured onto the vehicle floor 16.

Figure 4:
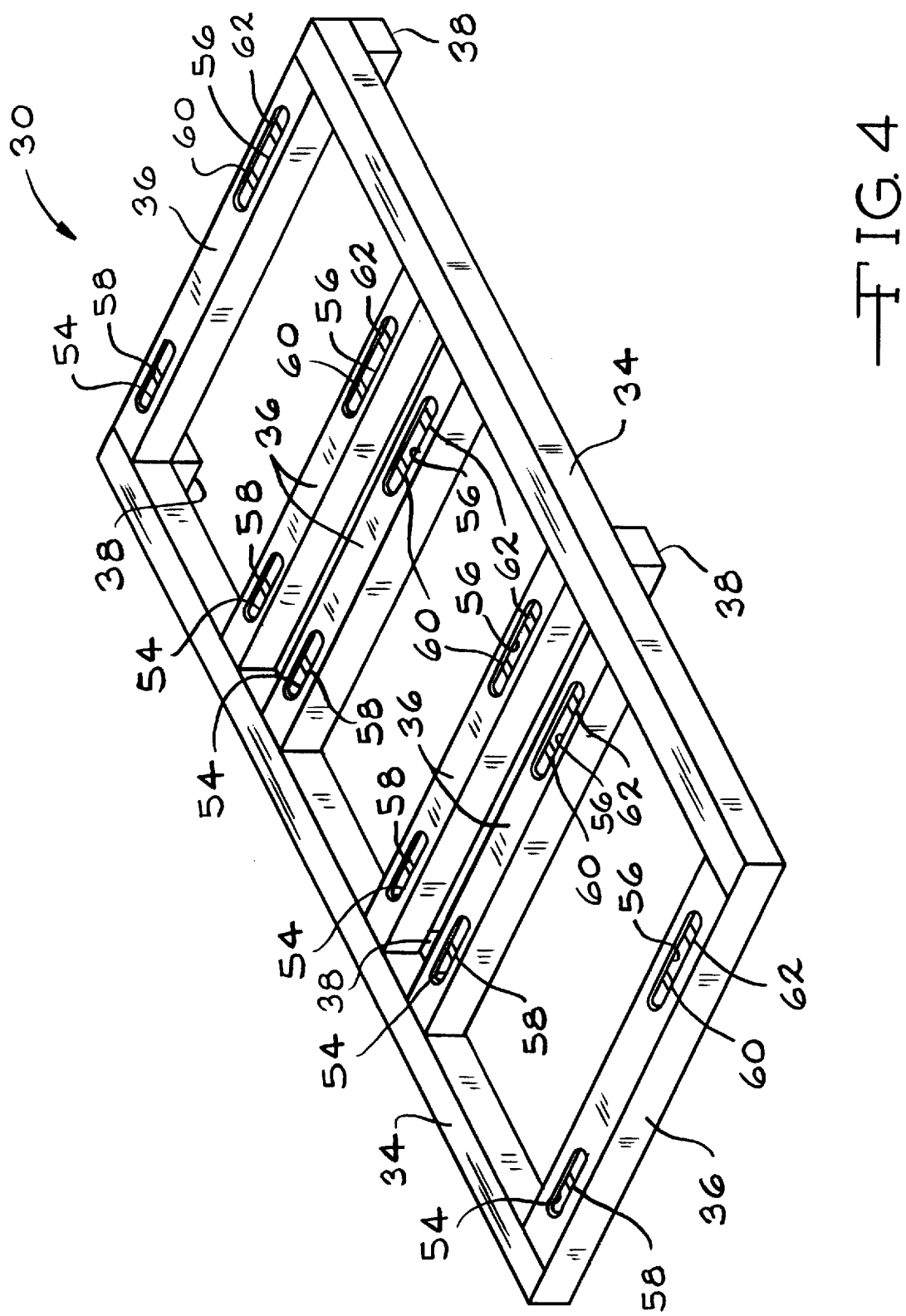
FIG. 4 is a perspective view of the first seat mounting bracket of FIG. 3.
Figure 5:
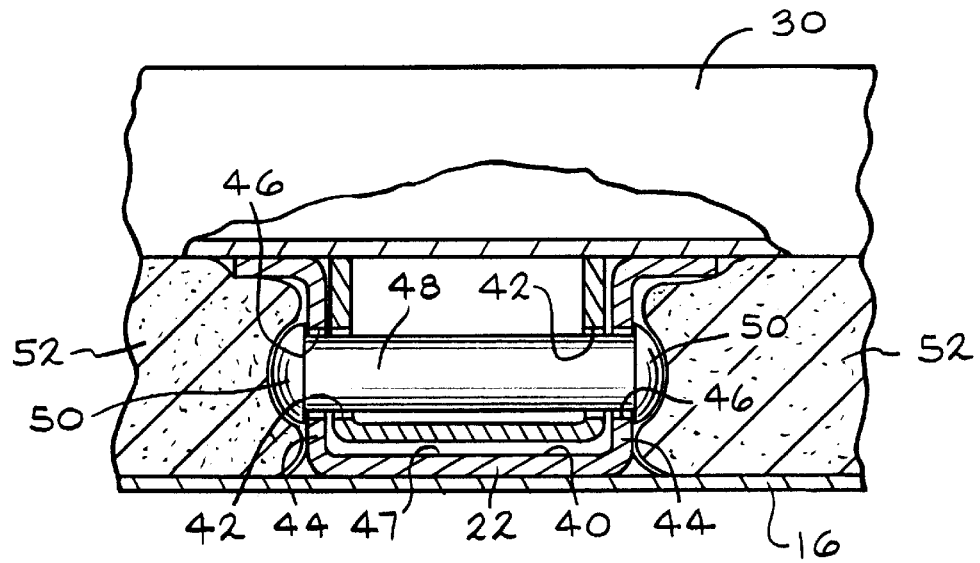
FIG. 5 is a sectional view taken along lines 5—5 in FIG. 3 illustrating the connection between the first seat mounting bracket and a rail fastened to the vehicle floor.

As illustrated in FIG. 4, the rear adapter bracket 30 includes a pair of laterally extending beams 34 connected by a plurality of longitudinally extending bars 36. The beams 34 and bars 36 can have any suitable cross-sectional shape to provide rigidity to the rear adapter bracket 30. Alternatively, the rear adapter bracket 30 could comprise a plate (not shown). The rear adapter bracket 30 further includes two pairs of legs 38 extending downwardly from the beams 34. As shown in FIG. 5, the legs 38 define mounting locations to secure the rear adapter bracket 30 to the vehicle floor 16. The legs 38 can be any suitable structure for insertion into a channel 40 formed in the rails 22. The legs 38 are spaced along the beams 34 to correspond with the distance between the rails 22.

As best shown in FIG. 5, the legs 38 preferably have openings 42 formed therein. The rails 22 have generally vertically extending side walls 44 having openings 46 formed therethrough. The side walls 44 and a lower wall 47 define the channel 40 of the rails 22. A pin 48 is inserted through the openings 46 of the side walls 44 of the rails 22 and the openings 42 of the legs 38 to retain the legs 38 within the channel 40, thereby securing the rear adapter bracket 30 to the vehicle floor 16. The pin 48 can be secured within the channel 40 by any suitable means, such as expanding or riveting ends 50 of the pin 48 to dimensionally increase the diameter of the ends 50. Alternatively, the pin 48 could be substituted for a threaded fastener arrangement, such as a carriage bolt and nut. Of course, the rear adapter bracket 30 could be secured to vehicle floor 16 by any suitable means. A covering material 52, such as padding and carpeting, is preferably placed above the vehicle floor 16 to conceal the rails 22 and the adapter brackets 30 and 32.

The rear adapter bracket 30 is configured to receive three of the seats 12. Each of the bars 36 has a pair of openings or slots 54 and 56 formed therein. The slots 54 expose a horizontally extending rod 58 adjacent and underneath each slot 54. The slots 56 expose a pair of horizontally extending rods 60 and 62, similar to the rods 58.

Figure 6:
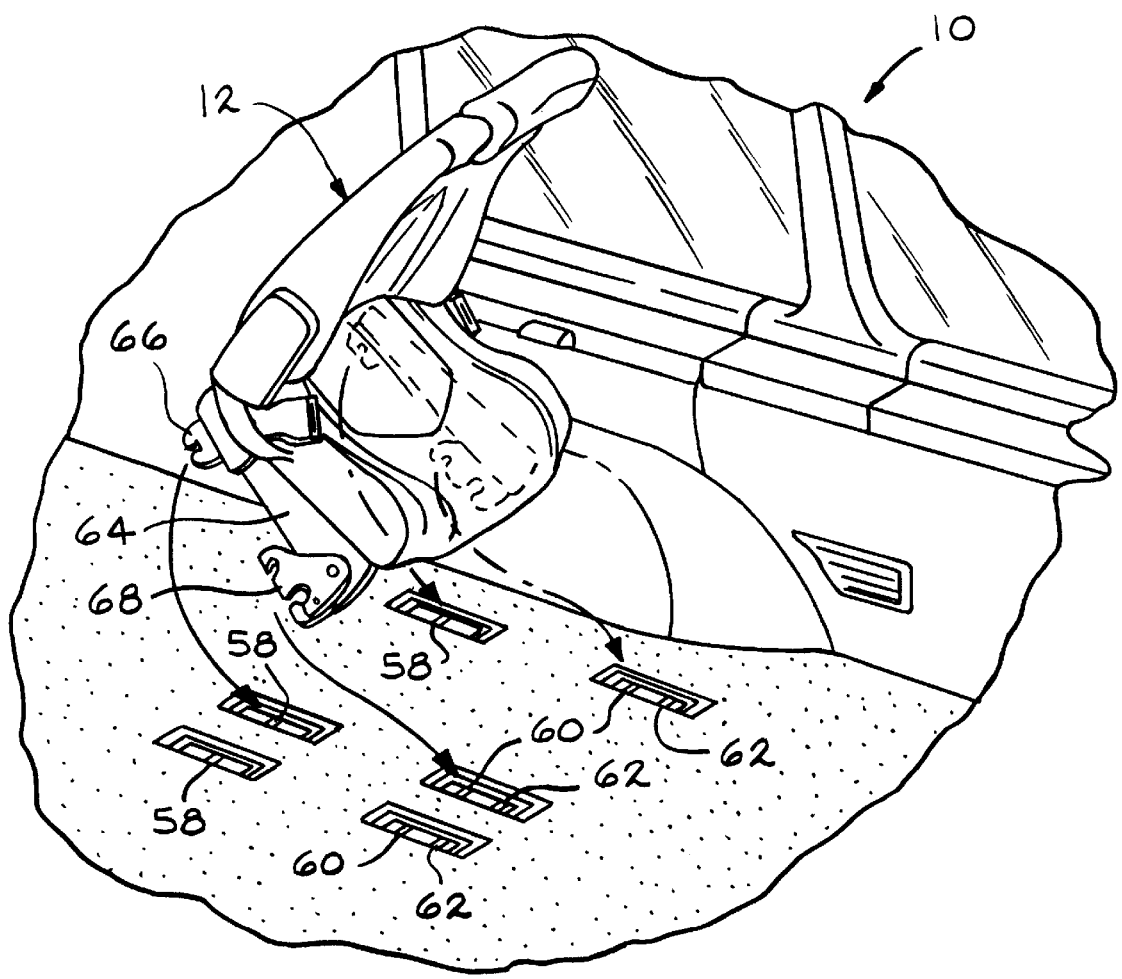
FIG. 6 is a perspective view illustrating the installation of a seat onto the first seat mounting bracket which has been previously attached to the vehicle floor.
Figure 7:
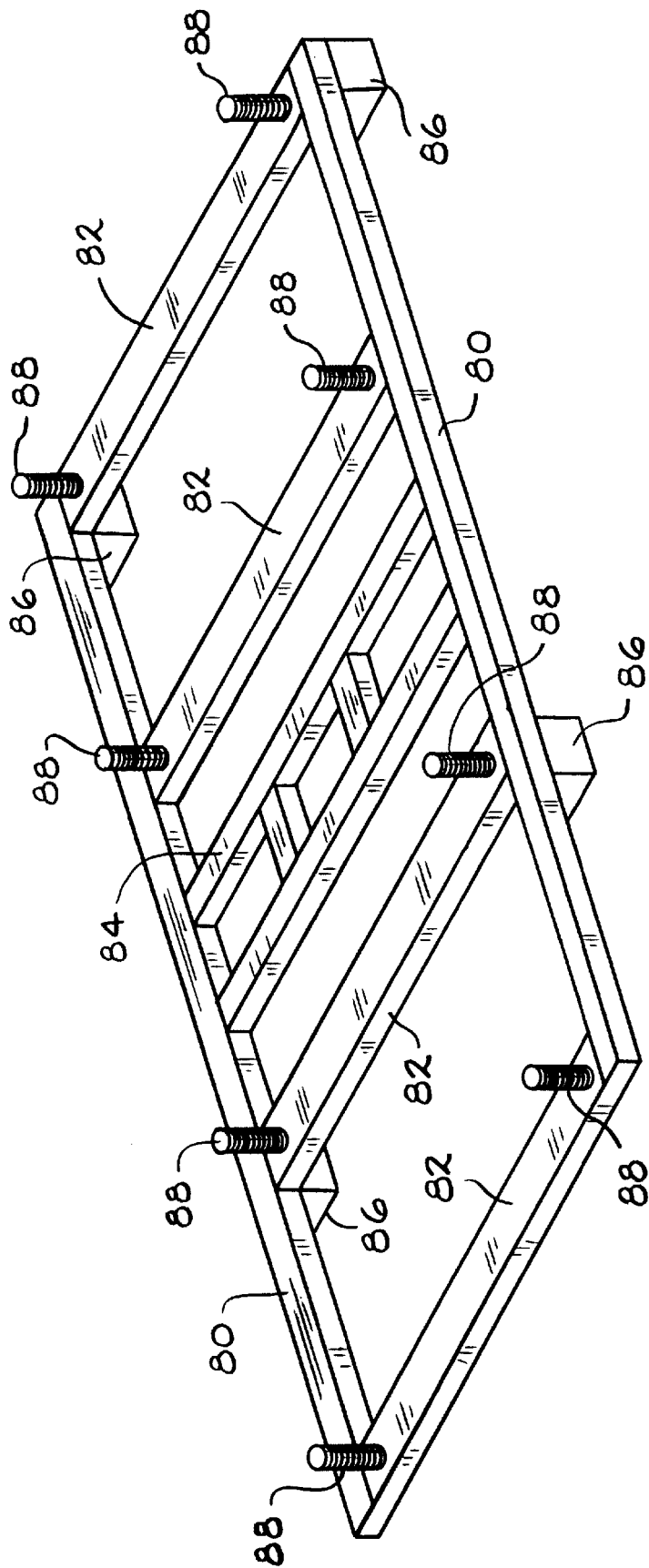
FIG. 7 is a perspective view of the second seat mounting bracket of FIG. 3.

There is shown in FIG. 6, a seat 12 being positioned and secured to the adapter bracket 30. The seat 12 has a lower frame 64. The frame 64 has first and second mounting members 66 and 68 extending downwardly therefrom. The mounting members 66 and 68 define mounting locations for the seat 12. The first mounting member 64 includes a hook receptacle 70 for mating with the rods 58 disposed in the slots 54. The second mounting member has dual hook receptacle 72 for mating with the rods 60 and 62. The use of hook receptacles formed on the seat and mating rods mounted on the floor are well known in the art for removably attaching seats to the floor of a vehicle. Of course, the seats 12 can be mounted on the rear adapter bracket 30 by any suitable means, such as by threaded fasteners.

The middle adapter bracket 32 is similar to rear adapter bracket 30 in having a pair of laterally extending beams 80 connected by a plurality of longitudinally extending bars 82. The middle adapter bracket 32 can also include structural reinforcement members 84 extending between the beams 80. The middle adapter bracket 32 can be secured to the vehicle floor 16 by any suitable manner, such as by securing legs 86 to side walls of a channel formed in the rails 22, as illustrated in FIG. 4, with respect to the rear adapter bracket 30. The middle adapter bracket 32 includes a plurality of threaded rods 88 extending upwardly from the bars 82.

Figure 8:
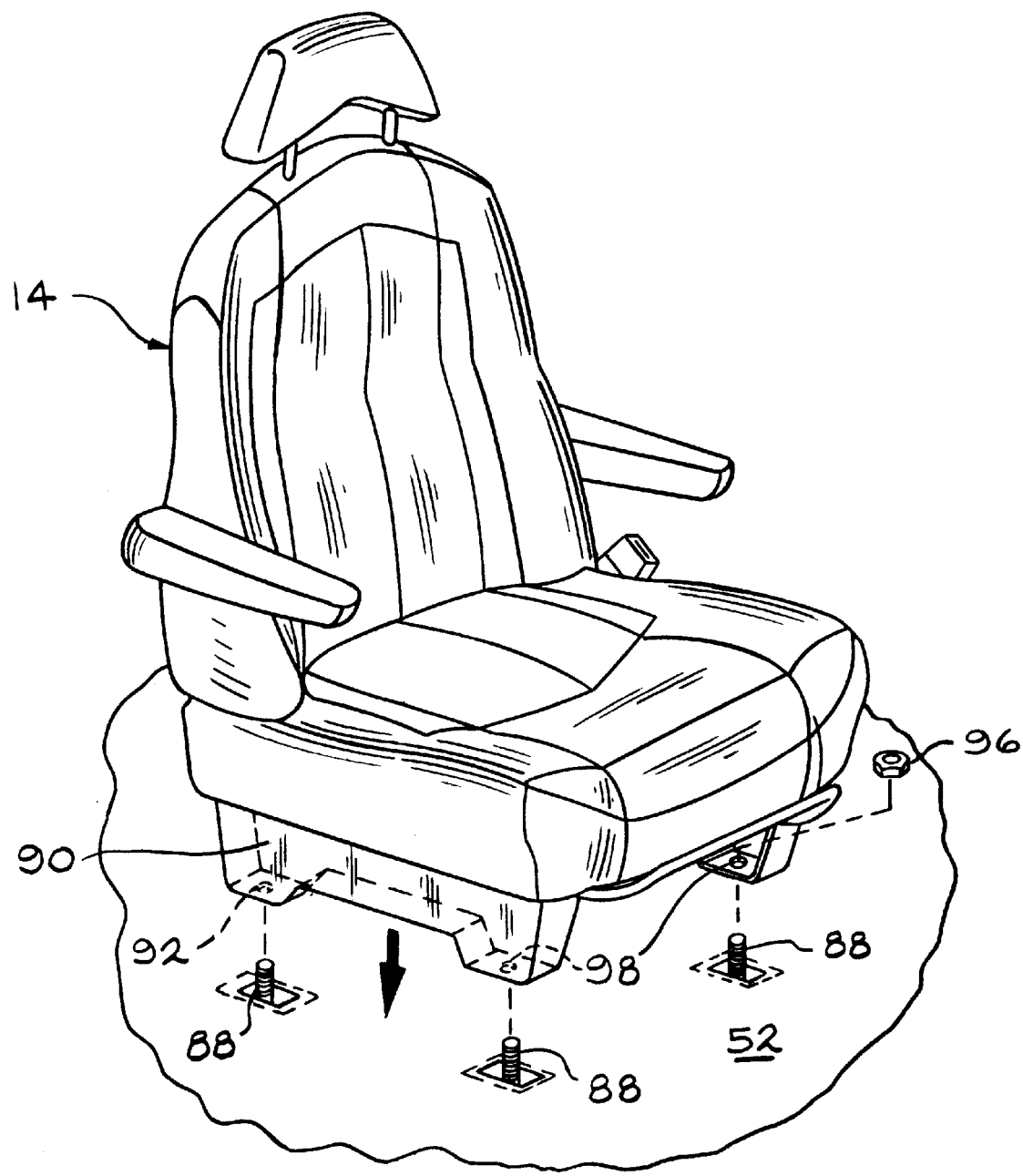
FIG. 8 is a perspective view illustrating the installation of a seat onto the second seat mounting bracket which has been previously attached to the vehicle floor.

As shown in FIG. 8, the seats 14 are installed onto the middle adapter bracket 32 by fastening the threaded rods 88 to a frame 90 of the seats 14. The frame 90 includes openings 92 formed therein corresponding to the location of the threaded rods 88 of the middle adapter bracket 32. The seats 14 can then be secured to the middle adapter bracket 32 by bolting the seats 14 with corresponding nuts 96. The openings 92 define mounting locations for the seats 14.

The adapter brackets 30 and 32 should be constructed sufficiently strong to transmit an impact load imparted on the respective seats, such as be rapid deceleration, through the adapter brackets 30 and 32 to the vehicle floor 16.

Figure 9:
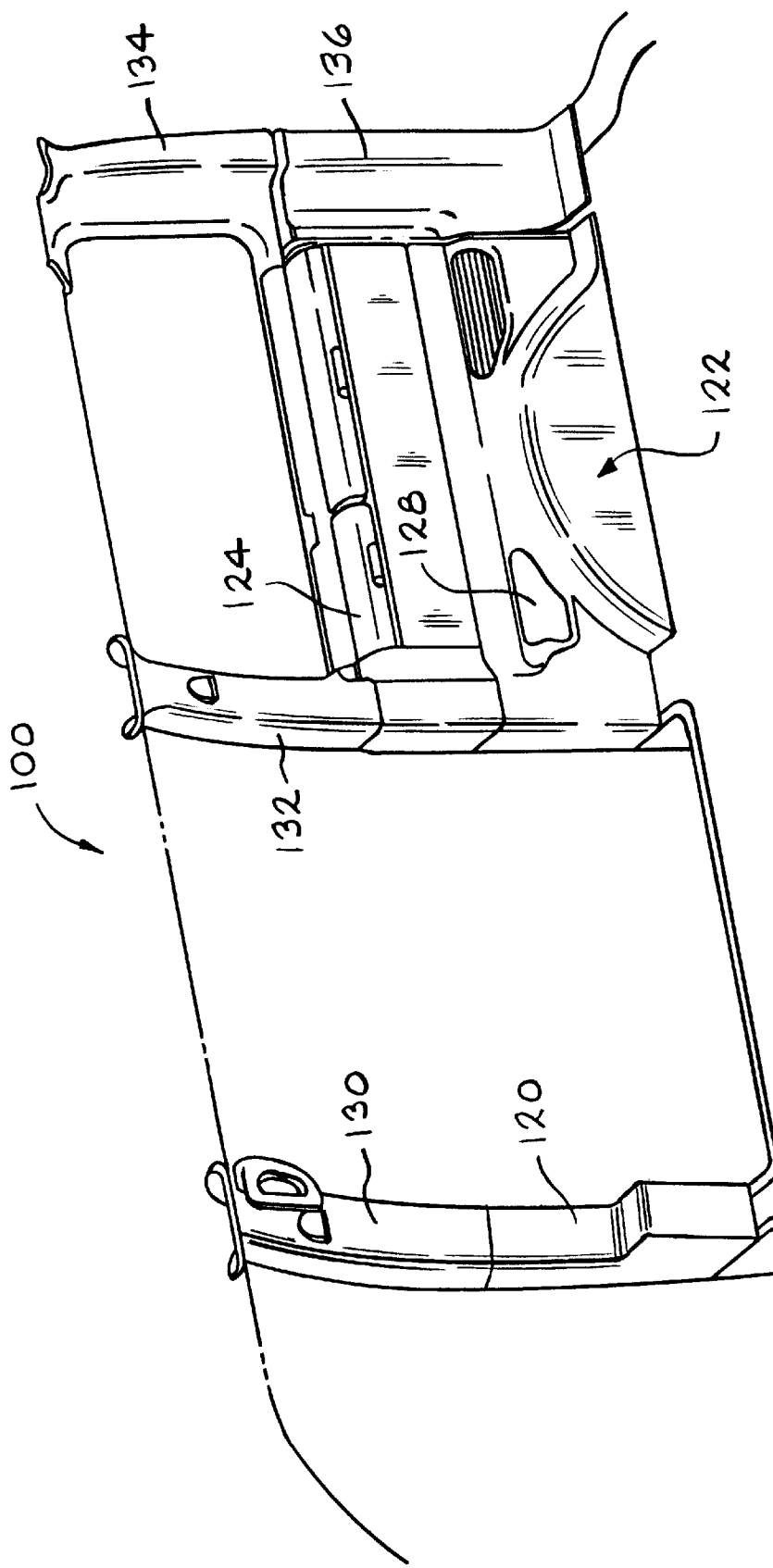
FIG. 9 is a perspective view of a first side of a vehicle interior having a framework covered by various trim panels.
Figure 10:
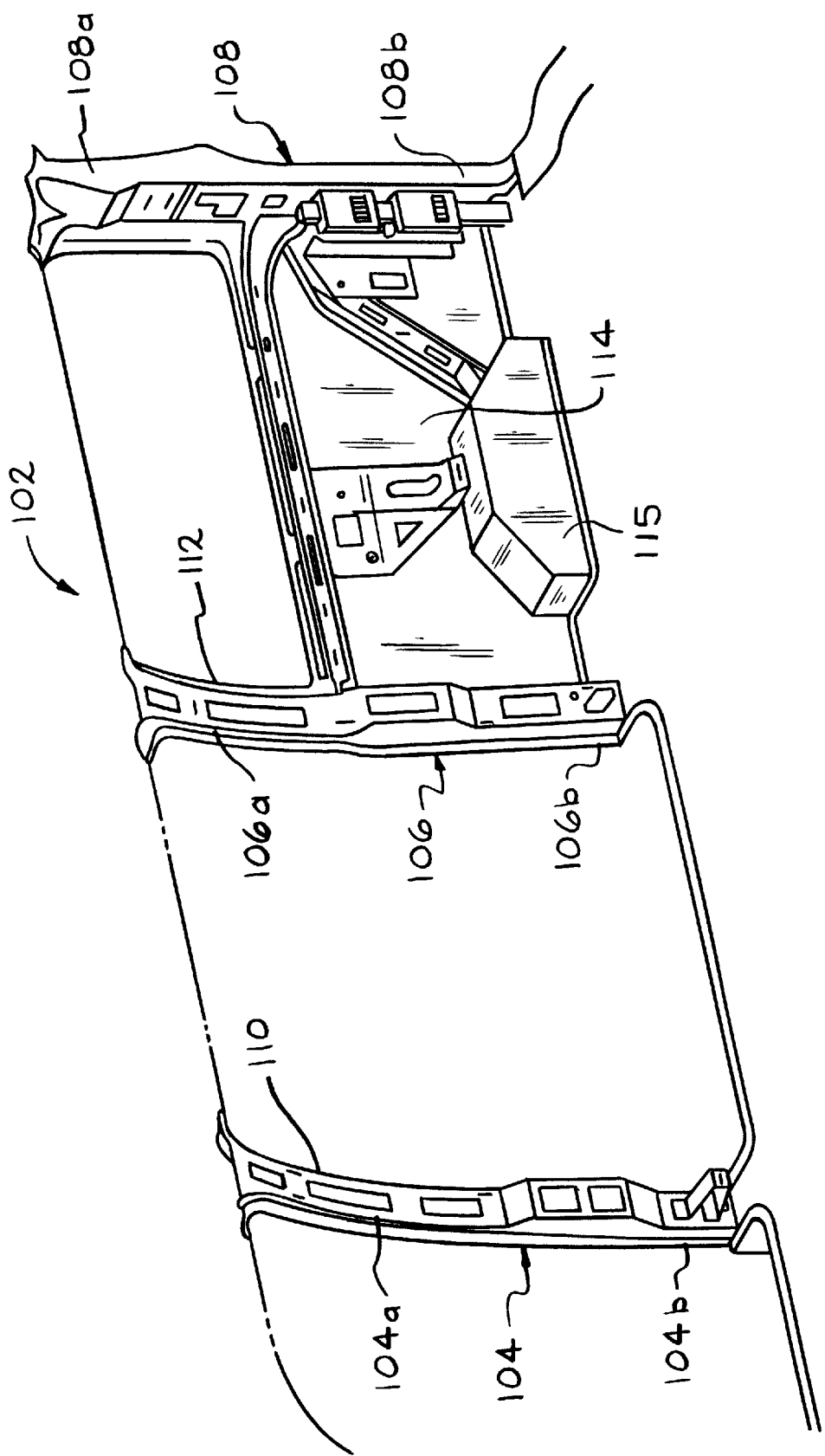
FIG. 10 is a perspective view of the uncovered framework of the first side of the vehicle interior of FIG. 9.

There is illustrated in FIG. 9, a first side of a vehicle interior, indicated generally at 100. As described in detail below, the first side of the vehicle interior 100 is covered with various trim panels, as shown in FIG. 9. As best shown in FIG. 10, the first side of the vehicle interior 100 includes a framework, indicated generally at 102. The framework 102 may also be the framework to support the vehicle exterior. The framework 102 can be formed of stamped and shaped sections of sheet metal. The panels can be fastened to the framework 102 by any suitable manner. The framework 102 generally includes vertically extending first, second, and third pillars 104, 106, and 108, respectively. A door opening 110 is defined between the first and second pillars 104 and 106. A window opening 112 is defined between an upper portion 106a of the second pillar 106 and an upper portion 108a of the third pillar 108. The framework 102 further includes a sill plate 114 between lower portions 106b and 108b of the second and third pillars 106 and 108, respectively. The sill panel 114 includes a wheel covering 115. If desired, a speaker 116 can be mounted on the sill plate 114.

Figure 11:
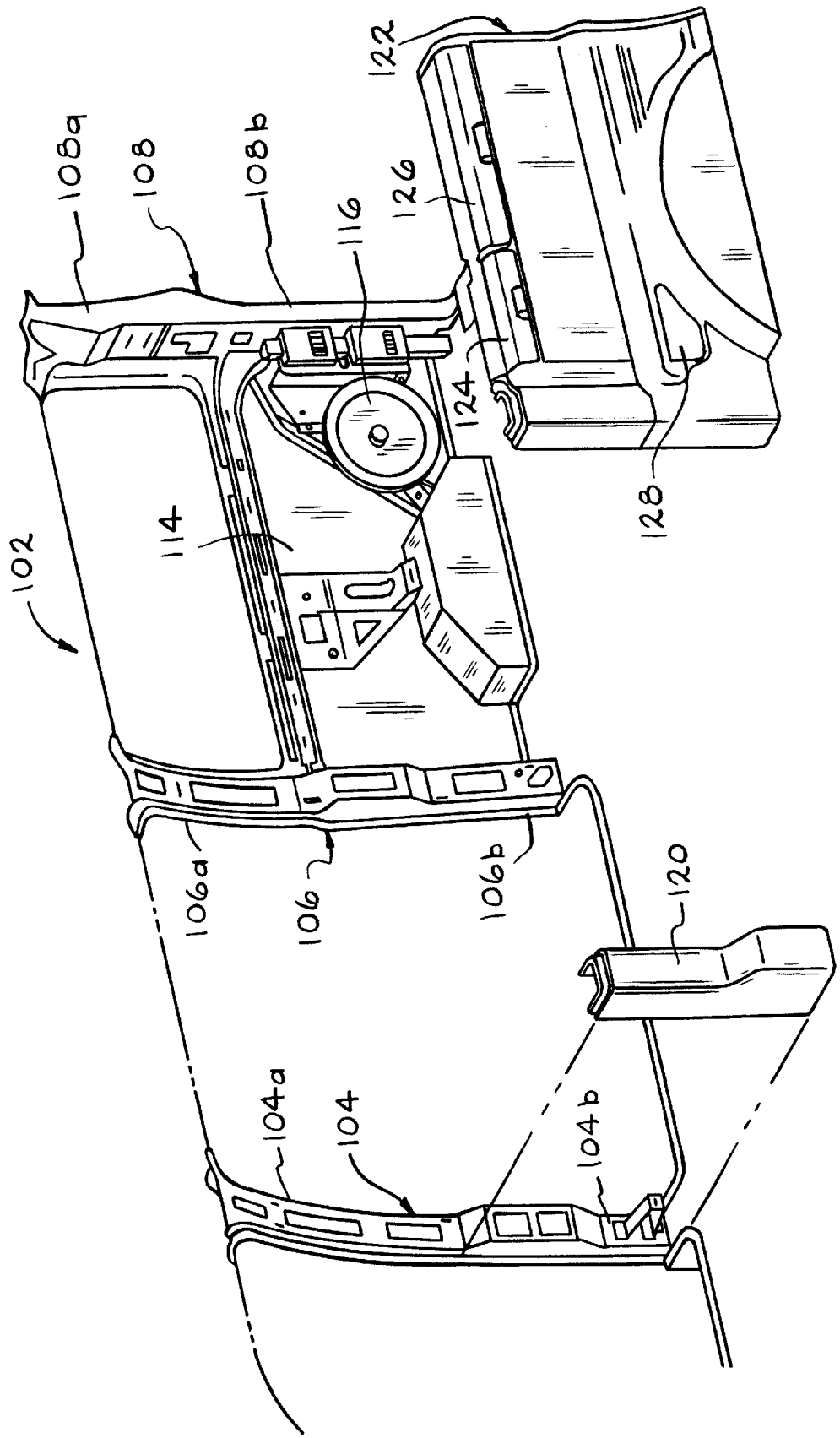
FIGS. 11 and 12 are perspective views illustrating the sequential installation of a various panels onto to the framework of the first side of the vehicle interior of FIG. 10.

As shown in FIG. 11, a first pillar panel 120 is fastened to a lower portion 104 of the pillar 104. A sill panel 122 is fastened to the sill plate 114. The sill panel 122 preferably covers the sill plate and at least one of the lower portions 106b and 108b of the pillars 106 and 108, respectively. As shown in FIG. 11, the sill panel 122 covers the sill plate 114 and the lower portion 106b of the second pillar 106. The sill panel 122 preferably includes storage compartments integral therewith covered by access doors 124 and 126. The sill panel 122 also preferably includes an opened storage compartment 128.

Figure 12:
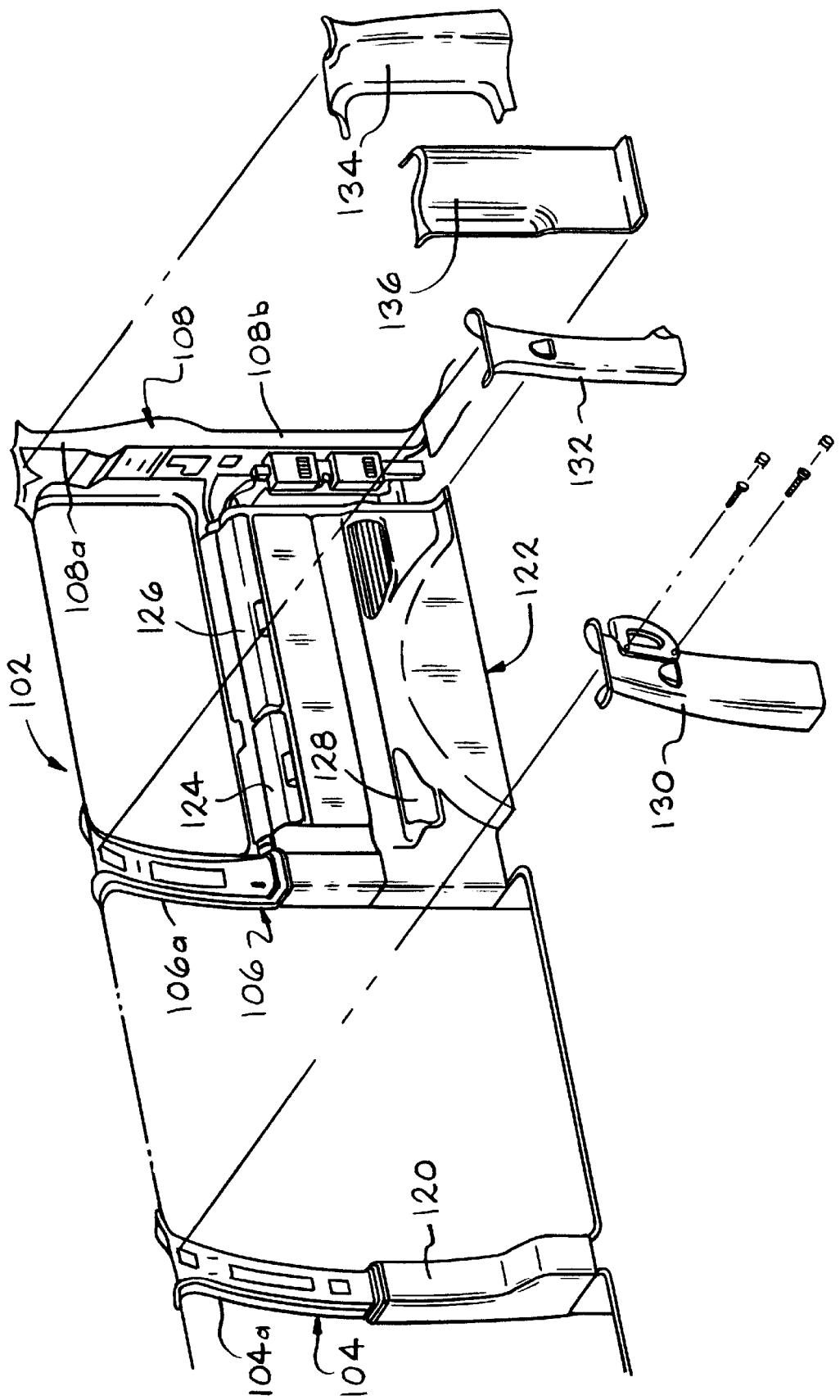

As shown in FIG. 12, a second pillar panel 130 is fastened to an upper portion 104a of the first pillar 104. A third pillar panel 132 is fastened to the upper portion 106a of the second pillar 106. A fourth pillar panel 134 is fastened to the upper portion 108a of the third pillar 108. A fifth pillar panel 136 is fastened to the lower portion 108a of the third pillar 108.

Figure 13:
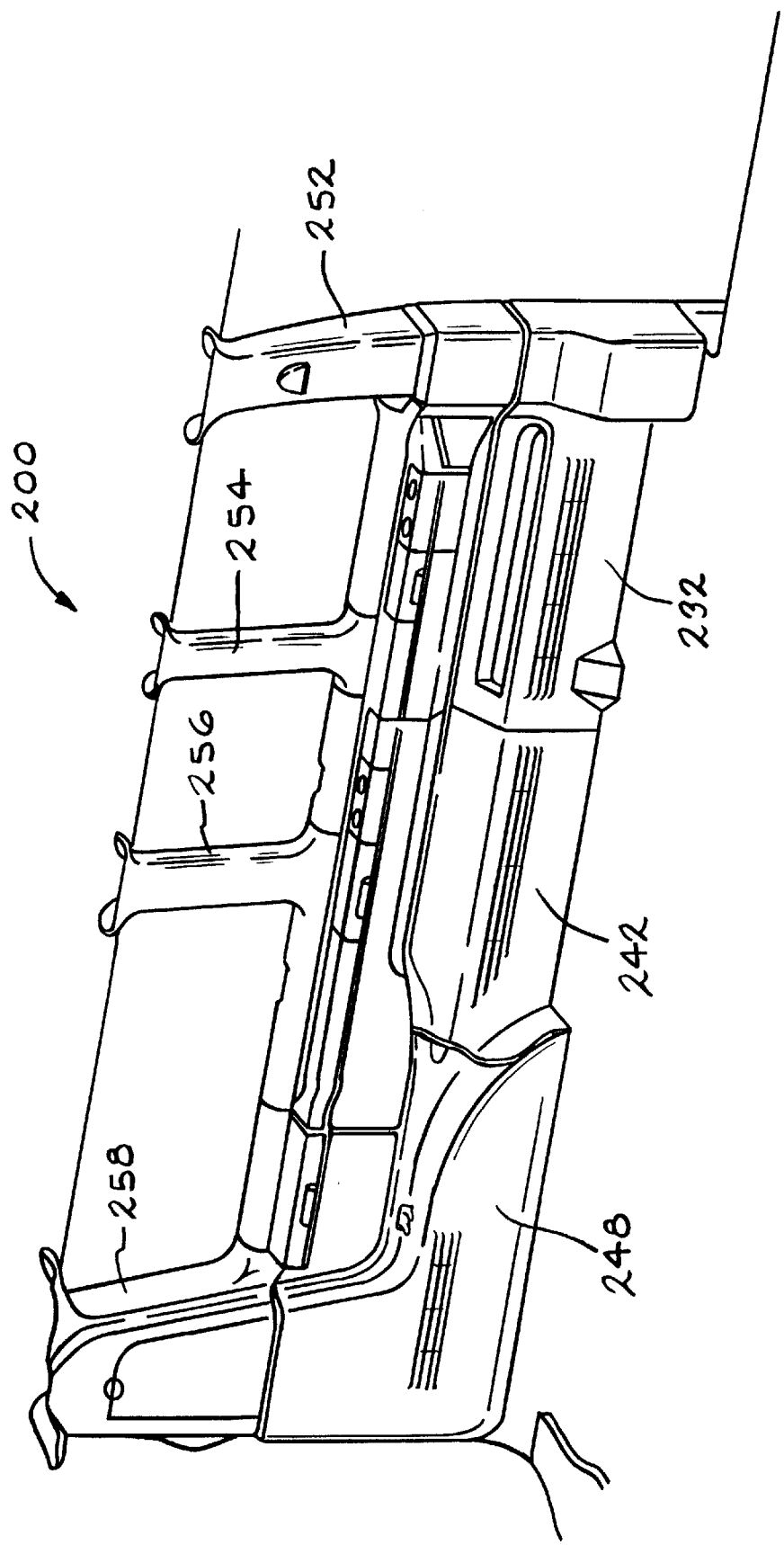
FIG. 13 is a perspective view of a second side of a vehicle interior having a framework covered by various trim panels.
Figure 14:
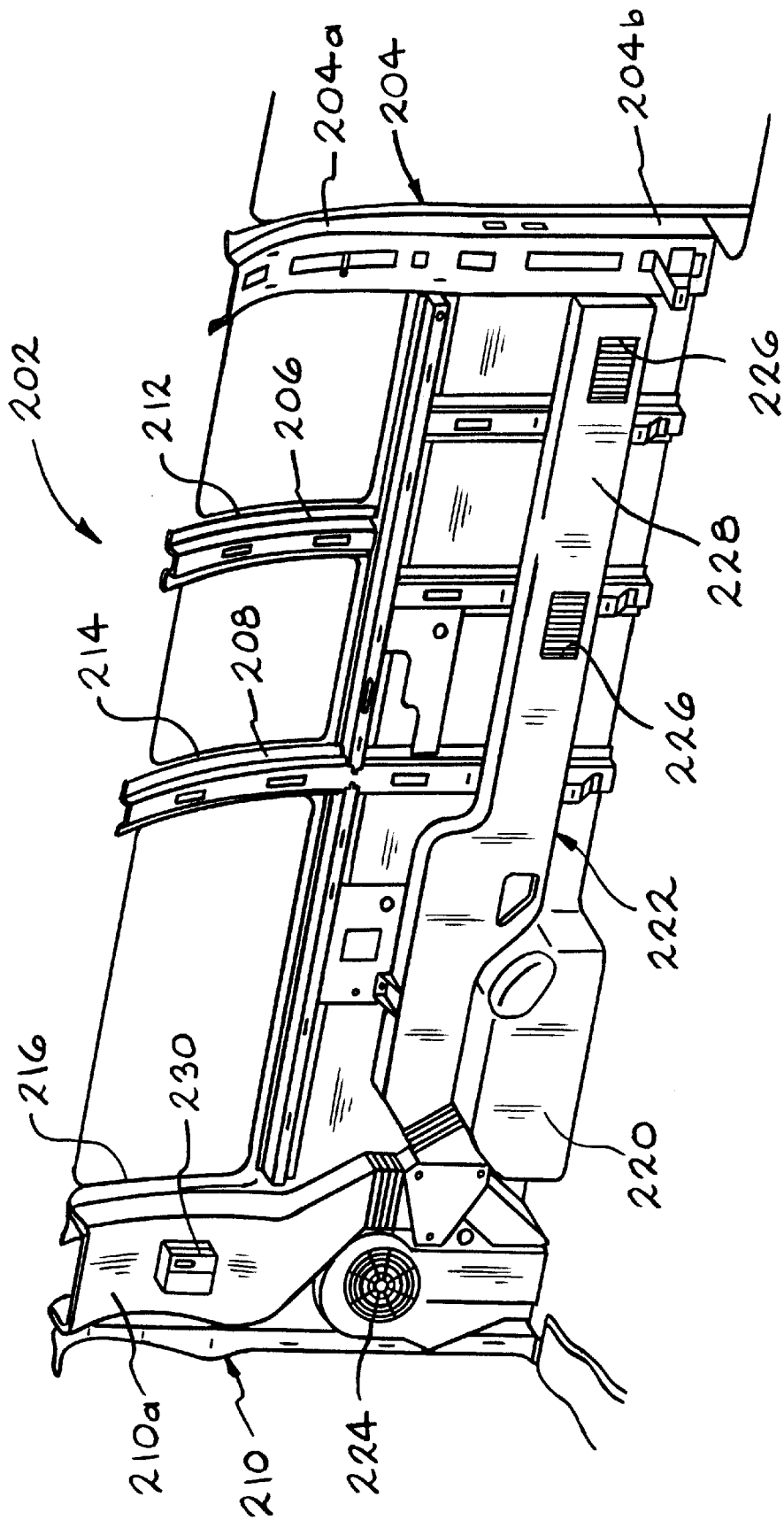
FIG. 14 is a perspective view of the uncovered framework of the second side of the vehicle interior of FIG. 13.

There is illustrated in FIG. 13, a second side of a vehicle interior, indicated generally at 200. As described in detail below, the second side of the vehicle interior 200 is covered with various trim panels, similar to the first side of the vehicle interior 100. As best shown in FIG. 14, the second side of the vehicle interior 200 includes a framework, indicated generally at 202. The framework 202 can be formed of stamped and shaped sections of sheet metal. The framework 202 generally includes vertically extending first, second, third, and fourth pillars 204, 206, 208, and 210, respectively. A first window opening 212 is defined between an upper portion 204a of the first pillar 204 and the second pillar 206. A second window opening 214 is defined between the second pillar 206 and the third pillar 208. A third window opening 216 is defined between the third pillar 208 and an upper portion 210a of the fourth pillar 210. The framework 202 further includes a sill plate 218 extending between a lower portion 204b of the first pillar 204 and a lower portion 210b of the fourth pillar 210. The sill plate 218 includes a wheel covering 220. A climate control system 222 can be fastened to the sill plate 218 if desired. The climate control system 222 includes a fan 224 and vents 226 formed in a duct 228 extending the length of the sill plate 218. A portable air compressor 230 can be mounted on the fourth pillar 210.

Figure 15:
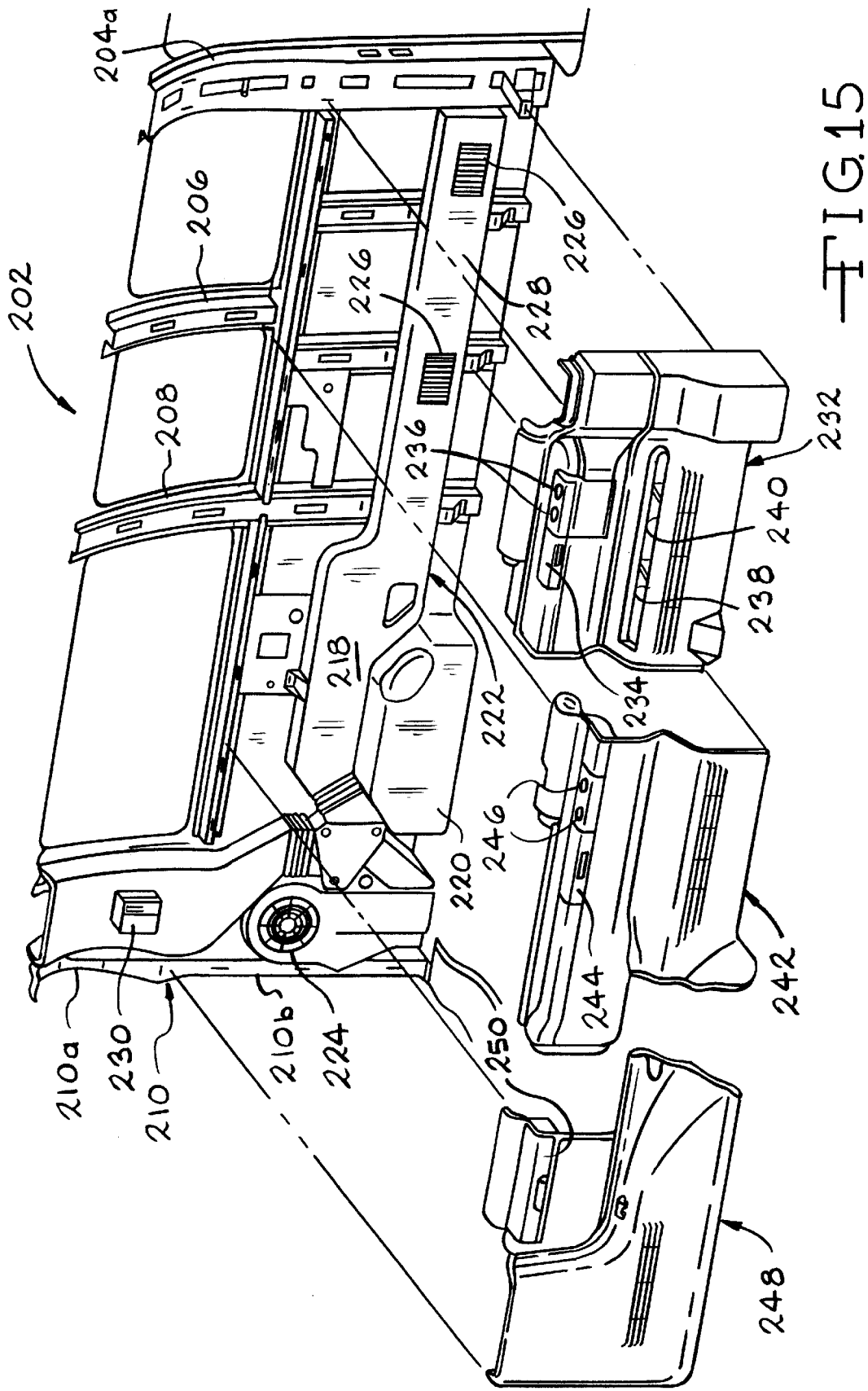
FIGS. 15 and 16 are perspective views illustrating the sequential installation of a various panels onto to the framework of the second side of the vehicle interior of FIG. 14.

As shown in FIG. 15, a first sill panel 232 is fastened to a portion of the sill plate 218 which also covers a lower portion 204b of the first pillar 204. The first sill panel 232 preferably includes a storage compartment integral therewith covered by an access door 234. The first sill panel 232 also preferably includes drink holders 236 and open storage compartments 238 and 240. A second sill panel 242 is fastened to a central portion of the sill plate 218. The second sill plate 242 preferably includes a storage compartment integral therewith covered by an access door 244. The second sill panel 242 also preferably includes drink holders 246. A third sill panel 248 is fastened to an end portion of the sill plate 218 which also covers a lower portion 210b of the fourth pillar 210. Preferably, the third sill panel 248 includes a storage compartment integral therewith covered by an access door 250.

Figure 16:
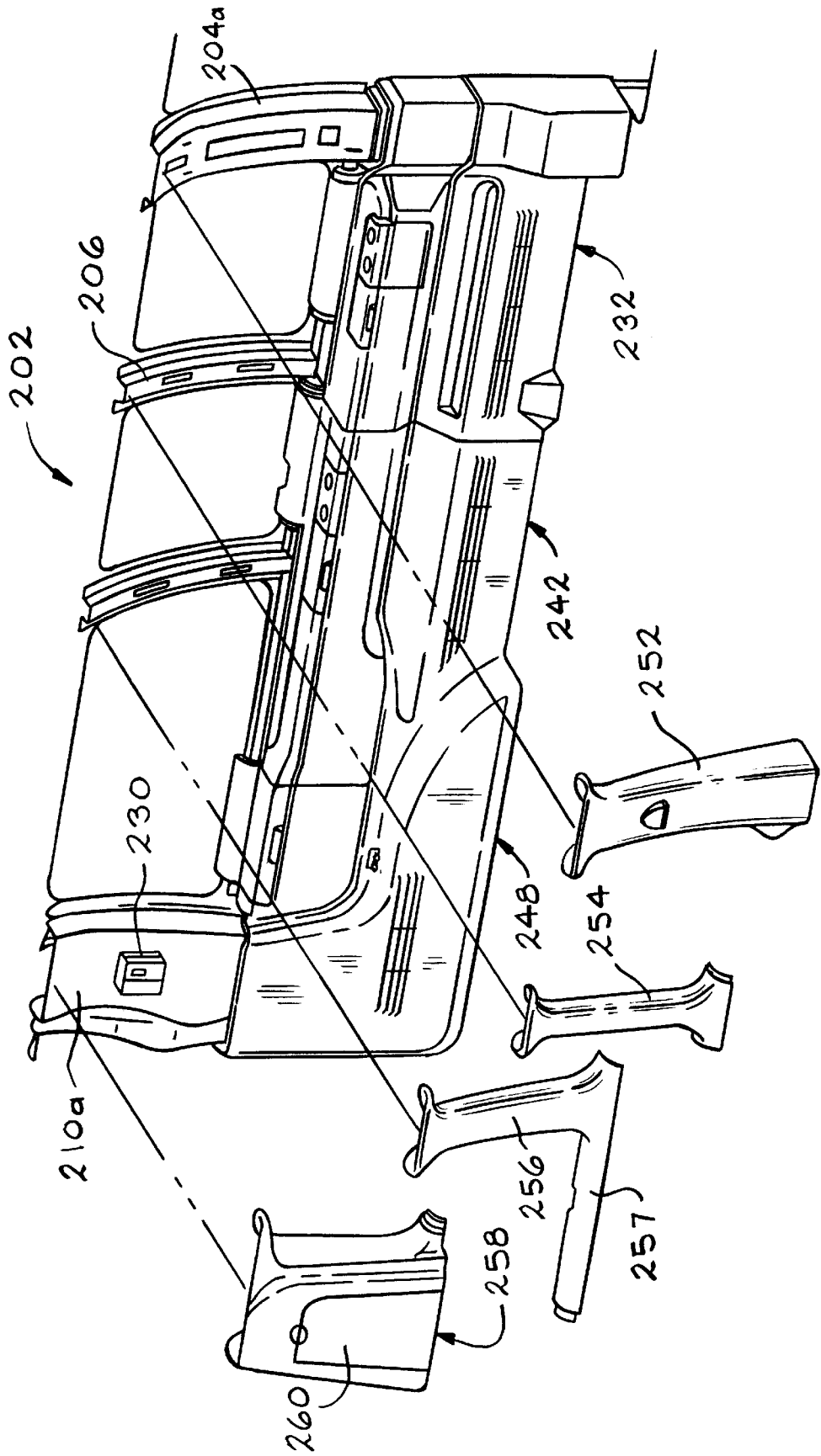

As shown in FIG. 16, a first pillar panel 252 is fastened to the upper portion 204a of the first pillar 204. A second pillar panel 254 is fastened to the second pillar 206. A third pillar panel 256 is fastened to the third pillar 208. Note that the third pillar panel 256 includes a generally horizontal sill portion 257 covering a portion of the sill plate 218 below a portion of the window opening 216. A fourth pillar panel 258 is fastened to the upper portion 210a of the fourth pillar 210. Preferably, the fourth pillar panel 258 includes an access door 260 for accessing the compressor 230.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of fastening a seat to a vehicle floor having preexisting seat mounting locations, the method comprising the following steps:

a) providing a seat having a frame with mounting locations different from the preexisting mounting locations of the vehicle floor;

b) providing an adapter bracket having first mounting locations corresponding to the mounting locations of the vehicle floor and second mounting locations corresponding to mounting locations of the frame of the seat:

c) securing the adapter bracket to the vehicle floor; and d) securing the frame of the seat to the adapter bracket, thereby fastening the seat to the vehicle floor.

2. The method of claim 1, wherein the mounting locations of the vehicle floor are defined along a rail fastened to the vehicle floor.

3. The method of claim 2, wherein the adapter bracket is provided with legs corresponding to the mounting locations of the floor, and wherein the adapter bracket is secured to the vehicle floor by fastening the legs to the rail.

4. The method of claim 3, wherein the legs are inserted into a channel formed in the rail.

5. The method of claim 1, wherein the preexisting seat mounting locations of the vehicle floor are different from the mounting locations of the frame of the seat due to the differences in spacing between adjacent mounting locations.

6. The method of claim 1, wherein the preexisting seat mounting locations of the vehicle floor are different from the mounting locations of the frame of the seat due to the difference in fasteners used for the mounting locations of the vehicle floor and the frame of the seat.

7. The method of claim 1, wherein the frame of the seat is secured to the adapter bracket by threaded fasteners.

8. The method of claim 1, wherein the frame of the seat is secured to the adapter bracket by hook receptacles mounted on the frame, the hook receptacles being mated with rods secured to the adapter bracket.

9. The method of claim 1, wherein a single adapter bracket is used to fasten a plurality of seats to the vehicle floor.

10. The method of claim 1 further including the step of covering the adapter bracket and vehicle floor with a covering material.

11. The method of claim 10, wherein the covering material is carpeting.

12. The method of claim 1, wherein the adapter bracket is comprised of a pair of elongated first members connected together by a plurality of elongated second members oriented generally perpendicular to the pair of first members.

* * * * *